Oct. 16, 1956 R. A. GAITHER ET AL 2,767,306
COMPOSITE BEAM VEHICLE HEADLAMP
Filed June 28, 1952 2 Sheets-Sheet 1
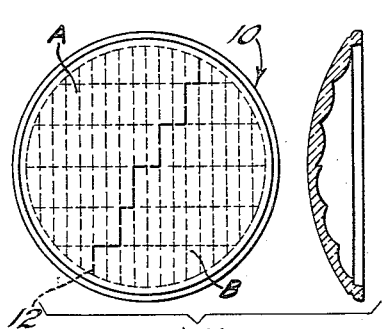
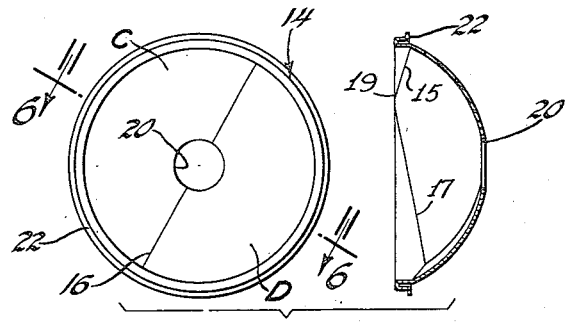
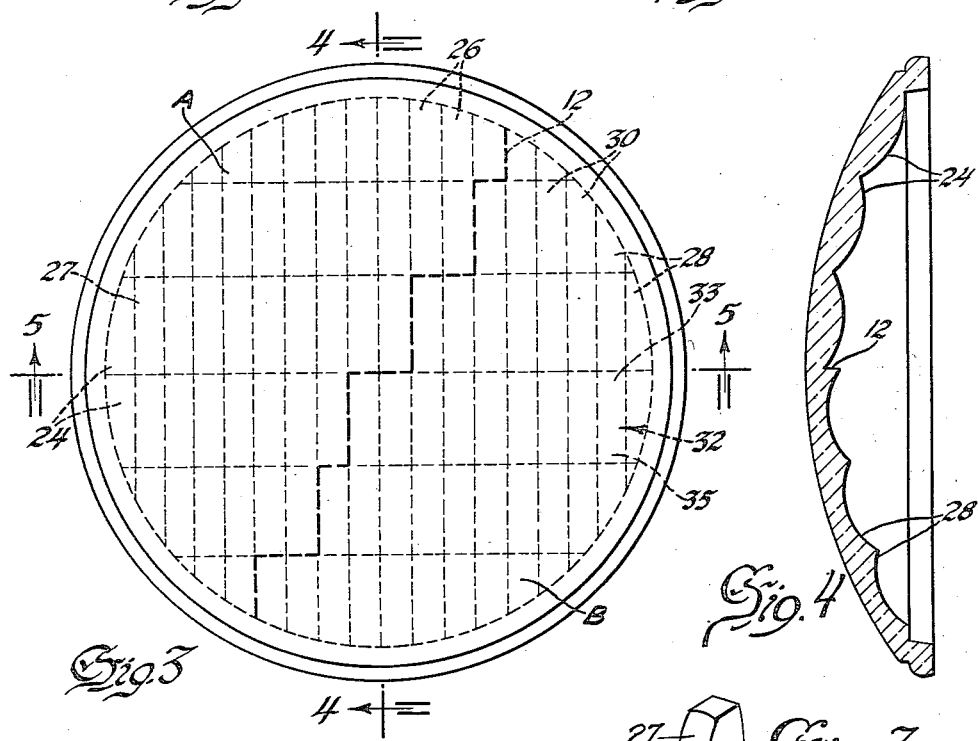
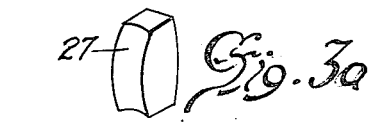
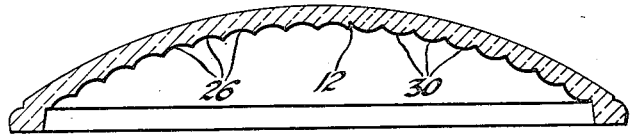
Inventor
Raymond A. Gaither &
George W. Onksen
By Willits, Helwig & Caillio
Attorneys Oct. 16, 1956 R. A. GAITHER ET AL 2,767,306
COMPOSITE BEAM VEHICLE HEADLAMP
Filed June 28, 1952 2 Sheets-Sheet 2
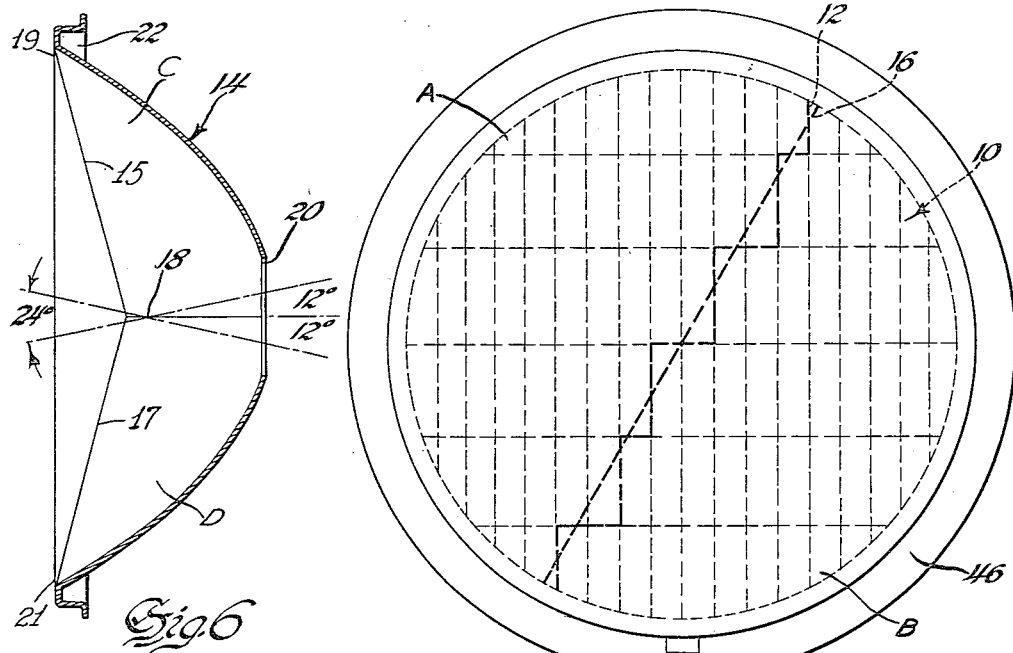
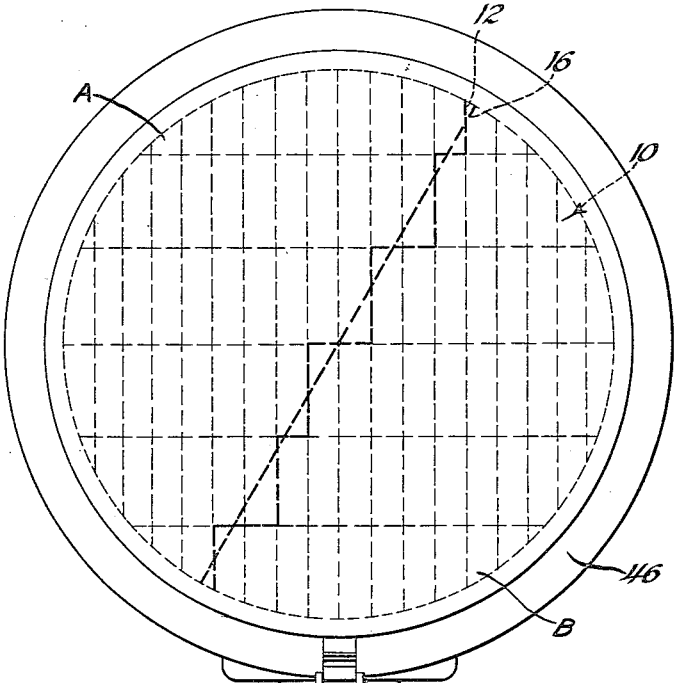
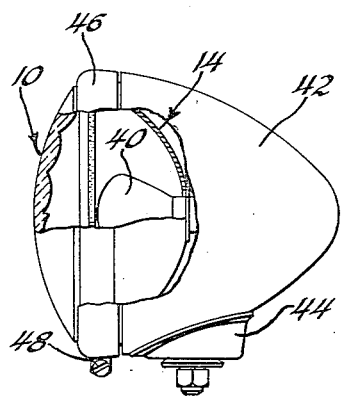
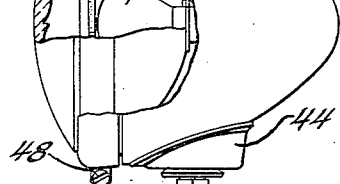
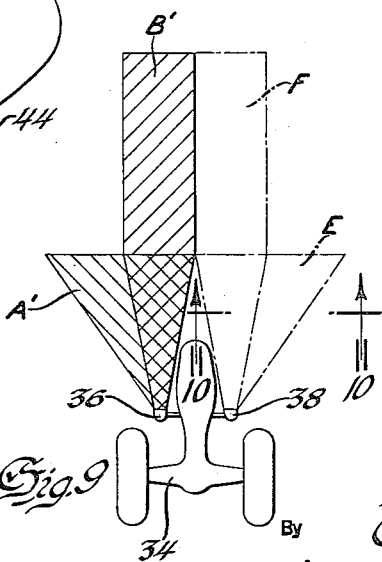
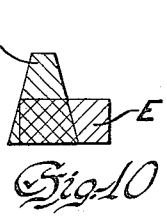
Inventor
Raymond A. Gaither &
George W. Onksen
By Willits, Helwig & Baillio
Attorneys

United States Patent Office 2,767,306
Patented Oct. 16, 1956

2,767,306
COMPOSITE BEAM VEHICLE HEADLAMP

Raymond A. Gaither, Pendleton, and George W. Onksen, Anderson, Ind., assignors to General Motors Corporation, Detroit, Mich., a corporation of Delaware Application June 28, 1952, Serial No. 296,136

8 Claims. (Cl. 240—41.3)

This invention relates generally to a vehicle lamp, and has particular relation to a lamp for projecting a particular illumination pattern upon the ground, both to the front and sides of the vehicle so that operation of the vehicle during the hours of darkness may be facilitated.

While the lamps of this invention may be employed for other uses, they are especially adapted for use as headlamps on tractors and other farm vehicles. As is well known, a great portion of farm work such as plowing, etc. is done at night, and for this reason tractors are furnished with ground illuminating equipment. It has been the practice heretofore to provide tractors with headlamps such as will illuminate the ground only to the front of the vehicle and to provide auxiliary lamps to project light to the ground laterally of the tractor. Generally the lens and reflector structures of the tractor headlamps is such that the beam projected defines a generally rectangular light pattern when projected on a vertical screen, which becomes a trapezoidal beam pattern, or a pattern which increases in width as the distance from the lamp increases, when projected on a horizontal screen or on the ground. One method of accomplishing such a beam pattern is to provide the lens with a plurality of horizontal flutes and with a plurality of vertical flutes superimposed over the horizontal flutes, each of the horizontal flutes and each of the vertical flutes having a constant radius of curvature from one end to the other along its respective axis of curvature. The radius of curvature of the vertical flutes will of course determine the amount of horizontal light spread attained, while the radius of curvature of the horizontal flutes will determine the vertical light spread attained. A lens of such a structure, therefore, consists of a plurality of contiguous surfaces of compound curvature, each of the surfaces being adapted to project a rectangular beam pattern on a vertical screen, or a trapezoidal beam pattern on the ground.

In U. S. application Serial No. 147,724, which is assigned to the assignee of the present invention, there is disclosed a headlamp lens fluted in such a way as to provide a trapezoidal beam pattern upon a vertical screen and a rectangular pattern upon a horizontal screen, or on the ground. This lens, just as the one heretofore described, may also consist of a plurality of contiguous surfaces of compound curvature; however, while the radius of curvature of each of the contiguous surfaces is constant along its horizontal axis of curvature, the radius of curvature of each of the contiguous surfaces along its vertical axis of curvature progressively decreases from top to bottom.

It is now proposed to change a lens of the character described in U. S. Serial No. 147,724 so as to not only provide a rectangular light pattern on the ground in front of the vehicle but also to provide adequate illumination to the side of the vehicle, thereby dispensing with the necessity for auxiliary lights which have previously served this purpose. In this manner full advantage may be taken of the illuminating characteristics of the so-called trapezoidal beam pattern, while at the same time the same lamp may be used to provide the necessary illumination to the sides of the vehicle.

Accordingly, it is an object of this invention to provide a lamp which will project a compound light beam, one portion of the beam defining a trapezoidal light pattern on a vertical screen.

Another object is to provide a lens which, in combination with a split reflector, will project a compound light beam, one portion of the beam defining a trapezoidal light pattern on a vertical screen and another portion of the beam defining a rectangular light pattern on a vertical screen.

Still another object of the invention is the provision of a vehicle lamp which projects a compound beam of light, one portion of the beam being such as can be directed to the front of the vehicle to define a rectangular beam on the ground or a trapezoidal beam pattern on a vertical screen, and another portion of the beam being such as can be directed laterally or to the side of the vehicle to define a light pattern which on the ground is trapezoidal and on a vertical screen is rectangular.

More particularly, it is an object of this invention to provide a vehicle headlamp with a reflector having a pair of parabolic sections tilted at an angle to each other and cooperative with a lens which is divided into two sections having angularly disposed vertical and horizontal flutes, one of the sections being constructed to project a light beam defining a trapezoidal beam pattern and the other of the lens sections being constructed to project a light beam defining a rectangular beam pattern.

These objects are carried out in accordance with the invention by the provision of a lens adapted for use in combination with a split reflector and divided into two sections, one of the sections consisting of a plurality of contiguous surfaces of compound curvature, each of the surfaces having a constant radius of curvature along the horizontal axis of curvature and a constant radius of curvature along the vertical axis of curvature, and the other of the sections consisting of a plurality of contiguous surfaces of compound curvature, each of these latter surfaces having a constant radius of curvature along the horizontal axis of curvature and a radius of curvature along the vertical axis which progressively decreases from top to bottom. Each of these lens portions is adapted for cooperation with a particular section of the split reflector so as to project a beam of light having the light directing properties of the particular reflector section and the light bending properties of the particular lens portion.

Other objects and advantages of the invention will appear more clearly from the following description of the preferred embodiments and from the drawings in which:

Figure 1 shows a front and a side view in section of a lens embodying the invention;

Figure 2 shows a front view and side view in section of a reflector of the type used in the lamps of this invention;

Figure 3 shows a front view of the lens shown in Figure 1, but drawn to a larger scale;

Figures 3a and 3b show individual flute portions of the lens shown in Figure 3;

Figure 4 is a view of the lens taken on the line 4—4 of Figure 3;

Figure 5 is a view of the lens taken on the line 5—5 of Figure 3;

Figure 6 is a view of the reflector taken on the line 6—6 of Figure 2 but in a larger scale;

Figure 7 is a front view of a lamp embodying the invention;

Figure 8 is a side view with parts broken away and in section of the lamp shown in Figure 7 but drawn to smaller scale;

Figure 9 is a diagrammatic view of a tractor provided with the lamps of this invention and illustrates the beam pattern as projected on a horizontal screen or on the ground; and Figure 10 is a diagram of the beam pattern as projected on a vertical screen and is taken on the line 10—10 of Figure 9.

Referring now to the drawings, and in particular to Figure 1, the lens 10 is provided with pluralities of horizontal and vertical flutes and is separated into two portions A and B by the diagonal stepped line 12 which divides various of the horizontal and vertical flutes into two portions having different optical or light bending properties. The light bending properties of lens portion A, as hereinafter described, are such as will project a rectangular beam pattern on a vertical screen, while the light bending properties of the lens portion B, as also hereinafter described, are adapted to project a trapezoidal beam pattern on a vertical screen. The lens 10 is cooperative with the reflector 14 shown in Figure 2 which is divided by the junction line 16 into two parabolic sections C and D, having the same size and shape and tilted toward each other in such a manner that the focal point of each reflector is at a common point. As can best be seen in Figure 6, the focal point 18 of the reflector sections C and D is located in a position normally occupied by the filament of a lamp bulb mounted in the reflector. Still referring to Figure 6, the angle between the focal axes of the reflector sections is, in the preferred embodiment, about 24°, each parabolic section being tilted toward the longitudinal axis of the reflector at about 12°. The lines 15 and 17 in Figures 2 and 6 indicate the edges of the parabolic sections of the reflector which, because the reflector sections are tilted toward each other, are spaced from the circumferential edge of the reflector except at two points shown at 19 and 21 in Figure 6. It is understood of course that the tilt angle between the reflector sections C and D need not necessarily be 24° since other angles may be used according to the exact beam pattern desired. This will be more fully understood as the description of the invention continues.

In Figure 2 the reflector is shown properly oriented for use on the left front headlamp (looking from the rear) of a vehicle, the junction line 16 being disposed at about 30° to the vertical. Likewise, in Figure 1, the lens 10 is shown properly oriented for use in the left front vehicle headlamp, the line of direction established by the stepped line 12 being at about 30° to the vertical. The reflector 14 is provided with an opening 20 which serves as a mounting position for a lamp bulb and with a peripheral outwardly extending flange 22 for mounting the lens 10. In mounting the lens 10 in the reflector 14 the stepped line 12 is positioned over the junction line 16 of the reflector so that the line of direction established by the stepped line 12 is superimposed over the junction line 16. This can clearly be seen by reference to Figure 7. In this regard it is preferable to provide some means on the lens and reflector to assure proper orientation. For this purpose reference lines may be used on the lens and reflector, or the lens may be provided with an orienting lug which engages a slot in the reflector flange 22 when properly mounted.

The detailed structure of the lens 10 can best be described with reference to Figures 3, 4 and 5. The lens portion A is provided with a multiplicity of parallel convex horizontal flutes 24 having a constant radius of curvature from one end to the other along the axis of curvature and a multiplicity of parallel concave vertical flutes 26 having a constant radius of curvature from one end to the other along the axis of curvature and optically superimposed over the horizontal flutes 24. In the preferred embodiment, the flutes 26 are physically superimposed over the horizontal flutes 24 and thus there results a plurality of contiguous rectangular surfaces of compound curvature of which the surface designated as 27 (see Figure 3a) serves as an example, each of these rectangular surfaces being adapted to project a beam of light which defines a rectangle on a vertical screen. We prefer to use a radius of curvature on the horizontal flutes such as will spread the light through about a 35° vertical angle and a radius of curvature on the vertical flutes to spread the light through about a 50° horizontal angle; however, it is to be understood that other radii of curvature can be used to attain other light bending properties. It will be noted that the horizontal flutes 24 are larger in size than the vertical flutes 26. While this structural feature is not essential, we have found it desirable, especially insofar as it affords simpler and less expensive molding technique. This will be more fully appreciated after consideration has been given to the lens section B wherein the relatively large size of the horizontal flutes has particular utility.

The lens portion B is provided with a plurality of parallel concave horizontal flutes 28 having a constant radius of curvature from one end to the other along the axis of curvature. Optically superimposed over each of the horizontal flutes 28 is a plurality of convex vertical flutes 30. Each of these vertical flutes 30 has a radius of curvature which gradually decreases from top edge to bottom edge. Thus, the lens portion B has a plurality of contiguous rectangular surfaces of compound curvature each of which is adapted to project a beam of light which defines a trapezoidal pattern on a vertical screen. The rectangular surface designated as 32 in Figure 3 serves to exemplify the optical characteristics of each of the plurality of contiguous rectangular surfaces resulting from the flute structure of lens portion B. The surface 32 has a concave curvature of constant radius from one side to the other on its horizontal axis of curvature and a convex curvature along its vertical axis, the radius of which gradually decreases from the top 33 to the bottom 35 (as shown in Figure 3b). Thus, the vertical light spread angle will be constant from side to side; however, the horizontal light spread angle will be comparatively small at the top and gradually increase toward a larger angle at the bottom. This results in a beam pattern which defines a trapezoid on a vertical screen or a rectangle on the ground.

The most advantageous radii of curvature for the horizontal flutes 28 and for the vertical flutes will of course depend upon the precise light pattern desired. We prefer to use a radius of curvatures such as will impart about a 45° vertical light spread angle to the horizontal flutes. For the vertical flutes the radius of curvature at the top of the sections, exemplified by 32, may be such as to spread the light through a 1° horizontal angle and gradually and uniformly decrease to a radius at the bottom of the section such as will spread the light through a 64° horizontal angle. The most desirable radii of curvature for the vertical flutes will, to a great extent, depend on the height at which the lamp is to be mounted on the vehicle. Thus, if the lamp is to be mounted three feet off the ground, the rate of change of the radii of curvature of the vertical flutes, from the top to the bottom of each contiguous section, should be such as will result in the definition of a rectangular light pattern on the ground in front of the vehicle.

In lens section B, the increased width of the horizontal flutes has particular advantage in that the resulting increased length of the surfaces 32 affords a greater working distance for changing the radius of curvature of the vertical flutes.

The use of the combination of convex and concave flutes as described has particular advantage in that simplicity of molding technique is thereby afforded; however, it is to be understood that all of the flutes may be concave or convex or other combinations of concave and convex flutes may be used within the spirit and scope of the invention. If the horizontal flutes 28 are convex rather than concave as shown, then the decrease in the radius of curvature of the vertical flutes 30 will of course be from bottom to top rather than from top to bottom in order to attain the trapezoidal beam pattern.

Likewise, some or all of the flutes may, if desired, be placed on the front of the lens or on the reflector so as to give the same optical results.

It will be apparent from the above description that the stepped line 12 defines the junction of the various concave and convex flutes and thus is visible; however, with other fluting arrangements, the line 12 may not be distinctly visible especially when the difference between the curvatures of the groups of flutes is quite small. The division of the lens into portions A and B by a line which is stepped is advantageous in that a less difficult molding technique is thereby afforded. The line 12 may, however, be perfectly straight, if desired. It will be noted that in the embodiment shown the stepped line 12 establishes a line which extends across the lens in a single direction.

If the lens 10 were used in a lamp with a conventional parabolic reflector, there would result generally superimposed trapezoidal and rectangular beam patterns on a vertical screen, the trapezoidal beam pattern characteristics depending upon the flute curvatures and the relative size of the lens portion B and the rectangular beam characteristics depending upon the flute curvatures and relative size of lens portion A. When, however, the lens 10 is mounted in the split reflector 14 as previously described, the reflector section C, which directs light slightly downwardly and to the left (as seen from the rear) cooperates with lens portion A to project the rectangular light pattern downwardly and to the left. At the same time reflector section D, which directs light slightly upwardly and to the right in respect to section C cooperates with lens portion B to project the trapezoidal light pattern straight ahead or down the road. The lamp shown and described would be used as the left front headlamp of the tractor or other vehicle. It is obvious that for the right headlamp the lens portions and reflector sections would be arranged accordingly so that the rectangular beam would be directed downwardly and to the right and the trapezoidal beam down the road. Thus, while the lines 12 and 16 extend from lower right to upper left on the left headlamp (as seen from the rear), the reflector and lens dividing lines on the right headlamp would extend from lower left to upper right.

Figures 9 and 10 diagrammatically illustrate the light beam characteristics of the lamps of this invention. In Figure 9, 34 is a tractor, 36 the left headlamp, and 38 the right headlamp. The beam A' is projected by the reflector section C through the lens portion A and the beam B' is projected by the reflector section D through the lens portion B. The beam from the right headlamp is likewise a composite, the beam E deriving its configuration from that portion of the right headlamp lens equivalent to lens portion A as shown and the beam F deriving its configuration from the right lamp lens portion equivalent to B as shown. It will be noted that the "down the road" beam defines a rectangle on the ground, while the lateral illumination is fan-shaped. Figure 10 shows the beam pattern on a vertical screen, the "down the road" beam defining a trapezoid and the lateral beam defining a rectangle. It will be apparent that the shapes of the light patterns may be varied by the use of flute curvatures other than those specifically mentioned and the relative positions of the two light patterns may be changed by the use of other tilt angles between the reflector sections.

The lamp housing for the reflector-lens assembly may be of any suitable type. A typical lamp embodying the invention is shown in Figures 7 and 8 in which 10 is the lens and 14 the reflector. A light bulb 40 is mounted in the reflector in the usual manner and the entire structure supported in a housing 42 provided with a suitable support 44 for attachment to the vehicle. A bezel 46 secures the lens in the housing and is fastened in place by means of a screw member 48. Other types of structure may of course be used. The invention may, for example, be embodied in a sealed beam lamp unit wherein the reflector is permanently and hermetically secured to the lens.

It is to be understood that, although the invention has been described with specific reference to particular embodiments thereof, it is not to be so limited. For example, light bending elements other than flutes, such, for example, as prisms, might be used. Also, either some or all of the light bending elements may, if desired, be provided on the reflector rather than on the lens. Similarly, other alterations and changes may be made which are within the full intended scope of this invention as defined by the appended claims.

We claim:

1. A lens for a headlamp or the like comprising a body divided into two portions of substantially equal size and shape and of differing light bending properties, one of said portions having a multiplicity of parallel horizontal flutes extending thereacross and a multiplicity of vertical parallel flutes optically superimposed over each of said horizontal flutes, each of said horizontal and said vertical flutes having a constant radius of curvature from one end to the other thereof thereby being adapted to project a rectangular light pattern on a vertical screen, and the other of said portions having a plurality of parallel horizontal flutes extending thereacross and a plurality of parallel vertical flutes superimposed over each flute of said plurality of horizontal flutes, each of the flutes of said plurality of horizontal flutes having a constant radius of curvature from one end to the other thereof and each of the flutes of said plurality of vertical flutes having a radius of curvature which decreases from the top edge to the bottom edge thereof, thereby being adapted to project a trapezoidal light pattern on a vertical screen.

2. A lens for a headlamp or the like comprising a body divided into two portions of substantially equal size and shape and of differing light bending properties, one of said portions having a multiplicity of parallel horizontal convex flutes extending thereacross and a multiplicity of vertical parallel concave flutes optically superimposed over said horizontal flutes, each of said horizontal and said vertical flutes having a constant radius of curvature from one end to the other thereof thereby being adapted to project a rectangular light pattern on a vertical screen, and the other of said portions having a plurality of parallel horizontal concave flutes and a plurality of parallel vertical convex flutes superimposed over said horizontal concave flutes, each of said concave horizontal flutes having a constant radius of curvature from one end to the other thereof and each of said convex vertical flutes having a radius of curvature which uniformly decreases from the top edge to the bottom edge of each of said concave horizontal flutes thereby being adapted to project a trapezoidal light pattern on a vertical screen.

3. A lamp comprising in combination a reflector divided into two parabolic sections of approximately equal size and shape, the focal axes of said sections being angularly arranged relative to one another, a lens positioned in front of said reflector, the plane of said lens being substantially perpendicular to the longitudinal axis of said reflector, and a light source between said lens and said reflector, said lens being divided into two portions of differing light bending properties, one of said portions having a multiplicity of parallel flutes extending thereacross in one direction and a second multiplicity of parallel flutes extending thereacross in another direction and optically superimposed over said first mentioned multiplicity of flutes, all of said flutes each having a constant radius of curvature from one end to the other thereof, and the other of said portions having a plurality of parallel flutes extending thereacross in one direction and another plurality of parallel flutes extending thereacross in another direction and optically superimposed over said first mentioned plurality of flutes, the radius of curvature of the flutes of one of said pluralities of flutes being variable from one edge to another of each of the flutes of the other of said pluralities of flutes, each of said reflector sections cooperating with one of said lens portions to project a beam of light having the light directing characteristics of said cooperating reflector section and the light bending properties of said cooperating lens portion.

4. A lamp comprising in combination a reflector divided into two parabolic sections, the focal axes of said sections being angularly arranged with respect to one another, said sections being of equal size and shape and having a common focal point, a lens positioned in front of said reflector, the plane of said lens being substantially perpendicular to the longitudinal axis of said reflector, and a light source positioned at the focal point of said reflector sections, said lens being divided into two portions of substantially equal size and shape and of differing light bending properties, one of said portions having a multiplicity of parallel horizontal flutes extending thereacross and a multiplicity of parallel vertical flutes optically superimposed over said horizontal flutes, each of said horizontal and said vertical flutes having a constant radius of curvature from one end to the other thereof, and the other of said portions having a plurality of parallel horizontal flutes extending thereacross, and a plurality of parallel vertical flutes superimposed over each flute of said plurality of horizontal flutes, each of the flutes of said plurality of horizontal flutes having a constant radius of curvature from one end to the other thereof, and each of the flutes of said plurality of vertical flutes having a radius of curvature which decreases from the top edge to the bottom edge thereof, one of said reflector sections cooperating with the first mentioned lens portion to project a light beam defining a rectangular pattern on a vertical screen and the other of said reflector sections cooperating with the second mentioned lens portion to project a light beam defining a trapezoidal pattern on a vertical screen.

5. A lamp comprising in combination a reflector divided into two parabolic sections, the focal axes of said sections being arranged at about a 24° angle with respect to one another, said sections being of substantially equal size and shape and having a common focal point, a lens positioned in front of said reflector, the plane of said lens being substantially perpendicular to the longitudinal axis of said reflector, and a light source positioned at the focal point of said reflector sections, said lens being divided into two portions of substantially equal size and shape and of differing light bending properties, one of said portions having a multiplicity of parallel horizontal convex flutes extending thereacross and a multiplicity of parallel vertical concave flutes optically superimposed over said horizontal flutes, each of said horizontal flutes having a constant radius of curvature to provide about a 35° vertical light spread and each of said vertical flutes having a constant radius of curvature to provide about a 50° horizontal light spread, and the other of said portions having a plurality of parallel horizontal concave flutes extending thereacross, and a plurality of parallel vertical convex flutes superimposed over each of said horizontal concave flutes, each of said concave horizontal flutes having a constant radius of curvature to provide about a 45° vertical light spread and each of said convex vertical flutes having a radius of curvature which decreases uniformly from the top edge to the bottom edge thereof, the radius of curvature at the top edge providing about a 1° horizontal light spread and the radius of curvature of the bottom edge providing about a 64° horizontal light spread, one of said reflector sections cooperating with the first mentioned lens portion to project a light beam defining a rectangular pattern on a vertical screen and the other of said reflector sections cooperating with the second mentioned lens portion to project a light beam defining a trapezoidal pattern on a vertical screen.

6. A lamp comprising in combination a reflector divided into two parabolic sections tilted toward each other so that the focal axes of said sections are angularly arranged relative to one another, a lens positioned in front of said reflector, the plane of said lens being substantially perpendicular to the longitudinal axis of said reflector, and a light source positioned at the focal point of said reflector sections, said lens being divided into two portions on a line substantially coinciding with the dividing line of said reflector, one of said portions having a plurality of contiguous rectangular surfaces of compound curvature, each of said surfaces having a radius of curvature along each of the axes of curvature which is constant from one end to the other of said surface, and the other of said portions having a plurality of contiguous rectangular surfaces of compound curvature, each surface of said second mentioned plurality of surfaces having a constant radius of curvature along one axis of curvature from one end to the other thereof and having a radius of curvature along another axis of curvature which constantly increases from one end to the other thereof.

7. A lamp comprising a reflector divided into two approximately equally sized parabolic sections tilted toward each other so that their focal axes are at an angle with respect to each other, a lens positioned in front of said reflector and a light source mounted between said reflector and said lens at the focal point of said reflector, said lens being divided into two portions along a line generally coinciding with the dividing line of said reflector, each of said lens portions having its surface formed with a plurality of contiguous rectangular light bending elements, all of the light bending elements in one of said portions being identical to each other and all of the light bending elements in the other of said portions being identical to each other, the light bending elements in one of said portions providing a greater lateral light spread than the light bending elements in the other of said portions, one of said reflector sections cooperating with one of said lens portions to project a lateral beam of light and the other of said reflector sections cooperating with the other of said lens portions to project a frontal beam of light directed at an angle with respect to said lateral beam of light.

8. A lamp comprising a reflector divided into two approximately equally sized parabolic sections tilted toward each other so that their focal axes are at an angle with respect to each other, a lens positioned in front of said reflector and a light source mounted between said reflector and said lens at the focal point of said reflector, said lens being divided into two portions along a line generally coinciding with the dividing line of said reflector, each of said lens portions being formed with a plurality of contiguous rectangular surfaces of compound curvature, all of the surfaces of compound curvature in one of said portions being identical to each other and all of the surfaces of compound curvature in the other portion being identical to each other, the surfaces in one of said portions having curvatures providing a greater lateral light spread and a smaller vertical light spread than the curvatures of the surfaces in the other of said portions, one of said reflector sections cooperating with one of said lens portions to project a lateral beam of light and the other of said reflector sections cooperating with the other of said lens portions to project a frontal beam of light directed at an angle with respect to said lateral beam of light.

References Cited in the file of this patent

UNITED STATES PATENTS

| | | |
|---|---|---|
| 1,251,211 | Forger | Dec. 25, 1917 |
| 1,345,073 | Clark | June 29, 1920 |
| 1,686,543 | Wood | Oct. 9, 1928 |
| 1,871,505 | Falge et al. | Aug. 16, 1932 |
| 1,955,599 | Lamblin-Parent | Apr. 17, 1934 |
| 2,253,615 | Falge et al. | Aug. 26, 1941 |
| 2,568,494 | Geissbuhler | Sept. 18, 1951 |
| 2,694,773 | Knopp et al. | Nov. 16, 1954 |